United States Patent [19]

McCord

[11] Patent Number: 4,572,767
[45] Date of Patent: Feb. 25, 1986

[54] VAPOR GENERATING AND RECOVERY APPARATUS

[76] Inventor: James W. McCord, 9101 Nottingham Pkwy., Louisville, Ky. 40222

[21] Appl. No.: 425,167

[22] Filed: Sep. 28, 1982

[51] Int. Cl.⁴ .............................................. B01D 3/00
[52] U.S. Cl. ..................................... 202/170; 202/202; 202/204; 203/98; 134/12; 210/320; 210/513
[58] Field of Search .................................. 134/10–12, 134/104–109; 202/170, 168, 169, 185.1, 163, 175, 176, 202, 204; 203/39, 98; 210/294, 320, 513

[56] References Cited

U.S. PATENT DOCUMENTS

| | | | |
|---|---|---|---|
| 2,153,577 | 4/1939 | Levine | 202/170 X |
| 2,162,656 | 6/1939 | Warrington | 202/170 X |
| 2,310,569 | 2/1943 | Booth | 134/12 |
| 2,447,840 | 8/1948 | Boss | 202/170 X |
| 2,834,359 | 5/1958 | Kearney | 202/170 |
| 3,015,576 | 1/1962 | Hendrixson et al. | 202/170 D X |
| 4,003,798 | 1/1977 | McCord | 202/160 |
| 4,032,033 | 6/1977 | Chu et al. | 134/11 X |
| 4,036,701 | 7/1977 | Clay et al. | 202/204 |
| 4,038,155 | 7/1977 | Reber | 202/204 |
| 4,078,974 | 3/1978 | McCord | 202/186 |
| 4,224,110 | 9/1980 | McCord | 202/169 |

Primary Examiner—Wilbur Bascomb
Attorney, Agent, or Firm—Charles G. Lamb

[57] ABSTRACT

A vapor generating and recovering apparatus for separating one component from a second component of a liquid solution and recovering one of the components comprising at least one chamber for generating vapor from the liquid solution and a condensing chamber for condensing the vapor. The at least one vaporizing chamber and condensing chamber being divided by an overflow weir having a controlled overflow area so that liquid solution will be caused to overflow at a preselected location along the length of the weir.

14 Claims, 9 Drawing Figures

VAPOR GENERATING AND RECOVERY APPARATUS

BACKGROUND OF THE INVENTION

(1) FIELD OF THE INVENTION

This invention relates to vapor generating and recovering apparatus for generating a vapor from a liquid and recovering the vapor by condensation. More particularly, this invention relates to a vapor generating and recovering apparatus for vaporizing a liquid solution in one chamber of the apparatus and condensing the vaporized solution in another chamber of the apparatus including selected overflow means between the chambers.

(2) DESCRIPTION OF THE PRIOR ART

In the cleaning of hard to clean objects, boiling solutions have been utilized in the removal of undesirable matter on the objects. The cleaning of these objects, such as tools, manufactured parts, and the like, is accomplished by immersing the soiled objects into the hot, boiling solution. In many apparatuses, at least two chambers are provided for carrying out the operation, one for vaporizing the cleaning solution and the other for condensing and recovering the vaporized solution. A straight weir is generally disposed between the chambers for providing means for the overflow of condensed liquid into the vaporizing chamber.

SUMMARY OF THE INVENTION

The present invention provides an apparatus for vaporizing a liquid solution in at least one chamber, condensing the vaporized solution in another chamber and returning the condensate to the vaporizing chamber over an overflow weir separating the chambers, said overflow weir has a controlled overflow area for directing the flow of the liquid into the vaporizing chamber.

More particularly, the present invention provides a vapor generating and recovery apparatus comprising a housing, a first weir disposed within and dividing the interior of the housing into two chambers; the first weir having means defining a liquid overflow area at a preselected location along the length of the weir for promoting the flow of liquid between the chambers, means for condensing vapor in the housing, and means for vaporizing liquid in the housing.

It is to be understood that the description of the examples of the present invention given hereinafter are not by way of limitation and various modifications within the scope of the present invention will occur to those skilled in the art upon reading the disclosure set forth hereinafter.

REFERRING TO THE DRAWINGS

DESCRIPTION OF THE PREFERRED EMBODIMENT

Figure 1:
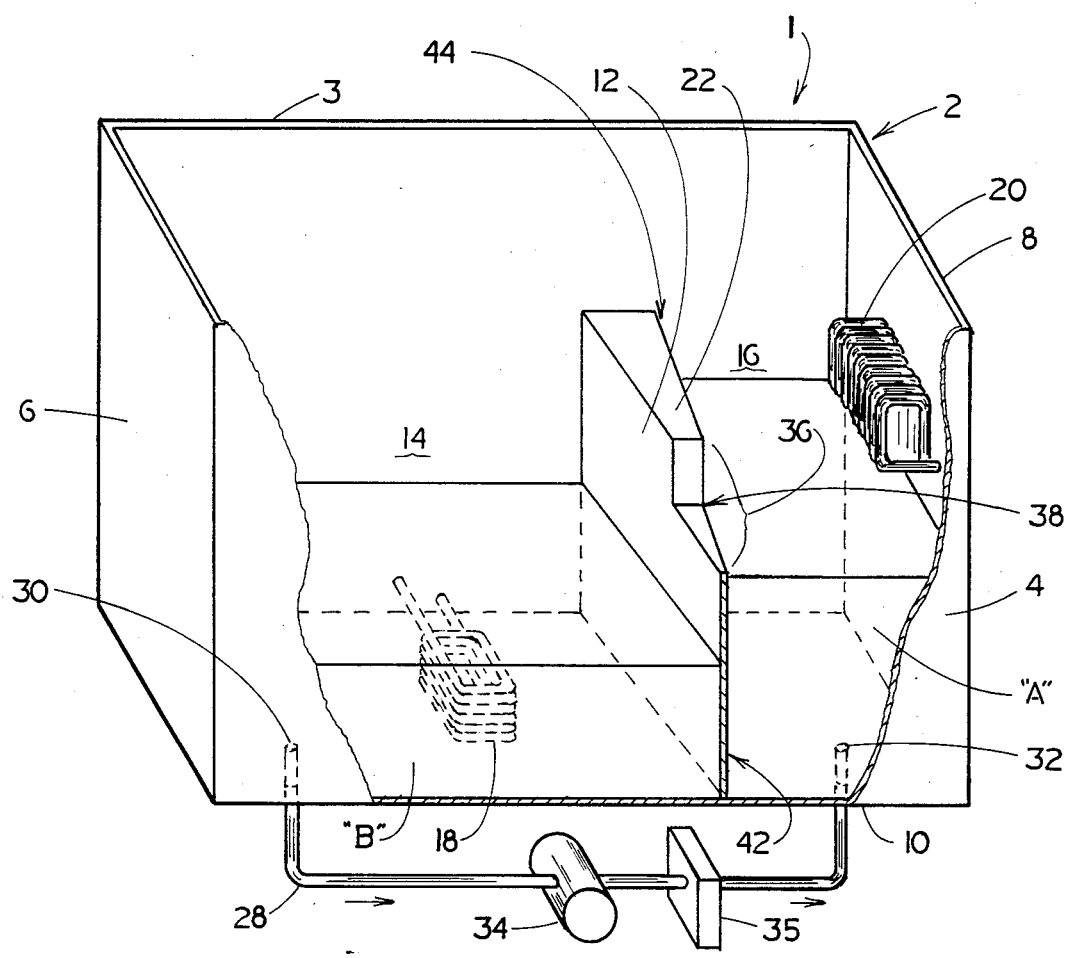
FIG. 1 is a perspective schematic representation of a preferred vapor generating and recovery apparatus embodying the present invention.

FIG. 1 illustrates an advantageous embodiment of a vapor generating and recovery apparatus 1 comprising a housing 2 which is shown to include two side walls 3 and 4, two end walls 6 and 8, and a bottom 10. A first weir is disposed across the housing 2 extending between the side walls 3 and 4 dividing the interior of the housing into two chambers, such as a vaporizing chamber 14 and a condensing chamber 16.

As shown, a heating coil 18 is located at the bottom 10 of the housing 2 in the vaporizing chamber 14, and a vapor condensing coil 20 is mounted near the end wall 8 of the housing in the condensing chamber 16 across from the weir 12.

The heating coil 18 provides sufficient heat to cause, for example, a liquid cleaning solution in the vaporizing chamber 14 to boil and vaporize.

The condensing coil 20 maintains a preselected temperature in the condensing chamber 16 below the vaporizing temperature of the liquid cleaning solution thereby causing the vaporized solution to condense in the condensing chambers 16 preventing it from escaping from the housing.

Virtually any means may be used to add heat to the heating coil 18 and remove heat from the condensing coil 20. One preferred means for so doing is a refrigerant system wherein the heating coil 18 is a refrigerant condensing coil of the system and the condensing coil 20 is a refrigerant evaporator coil of the system. One such advantageous refrigerant system is described in U.S. Pat. No. 4,003,798.

Re-circulating means is located in the housing 2 to move fluid from the vaporizing chamber 14 to the condensing chamber 16. The re-circulating means is shown as comprising a conduit 28 having its first open end (inlet) 30 in the bottom of chamber 14. The other open end (outlet) 32 of the conduit 28 is open to the condensing chamber 16 near the bottom of the condensing chamber and near the wall 8. A pump 34 is located in conduit 28 to pump the liquid from the solution in the vaporizing chamber 14 back to the condensing chamber 16 as indicated by the flow arrows. In addition, a filter 35 is located in the conduit 28 to separate the particulates from the liquid before returning the liquid to the condensing chamber 16.

In operation, the re-circulating means forces liquid from chamber 14 into chamber 16 and up the wall 8 thereby causing a rolling action of liquid toward the weir 12. The weir 12 is advantageously provided with an overflow area, generally denoted by the number 36, for controlling the overflow along the length of the weir over which the condensed solution overflows into the vaporizing chamber 14 from the condensing chamber 16. The overflow area 36 is defined by a notch 38 formed in the upper edge 22 of the weir 12. Preferably, the notch 38 is located toward one end of the weir 12.

Figure 2:
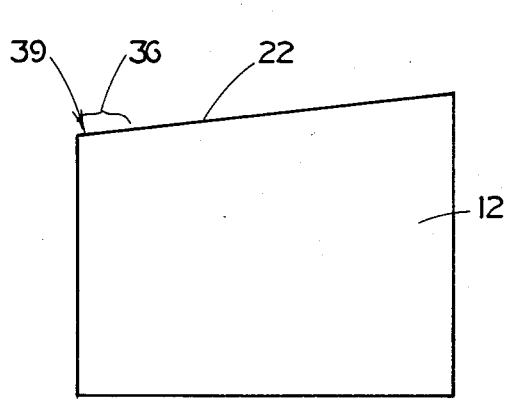
FIG. 2 is an elevational view of one embodiment of the weir of the apparatus of FIG. 1.

FIG. 2 illustrates the weir 12 wherein the top edge 22 is inclined defining the overflow area 36 at the lower portion of the inclined top weir edge 22. As shown, preferrably the top edge 22 is inclined from one end of the weir to the opposite end of the weir so that the overflow area 36 is located at one corner of the vaporizing chamber 14 and defined by the lower region 39 of the inclined top edge 22 of the weir 12.

Figure 3:
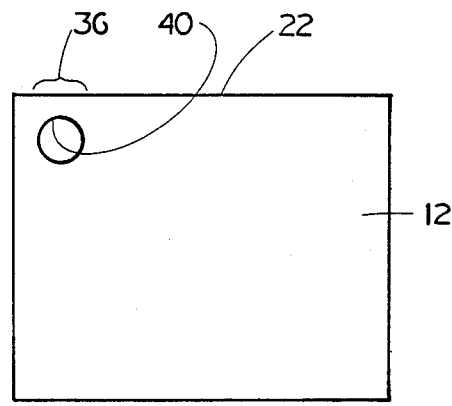
FIG. 3 is an elevational view of another embodiment of the weir of the apparatus of FIG. 1.

With reference to FIG. 3 there is shown the weir 12 with the overflow area 36 defined by an aperture 40 formed through the weir below the top edge 22 of the weir. While the aperture 40 is shown as being circular in peripherial shape, other shapes such as, for example, rectangular or triangular can be used. As with the overflow area 36 defined by the notch 38 (FIG. 1) or low region 39 (FIG. 2) of the top weir edge 22, discussed above, the aperture 40 defining the overflow area 36 is advantageously located toward one end of the weir 12 which is the most distant from the wall 8 (FIG. 1).

Again with reference to FIG. 1, the wall surface of the weir 12 in the condensing chamber 16 is tapered such as to provide an acute angle between the weir 12 and adjoining side wall 4 in the condensing chamber 16. This is accomplished by slanting the wall surface of the weir so that it is in non-parallel relationship to the housing end wall 8 across the condensing chamber 16 from the weir 12. Thus, the acute angle defined between the weir wall and adjacent housing side wall 4 defines a corner 42 of the vaporizing chamber 16 which is farther away from the housing end wall 8 than is the other corner 44 of the condensing chamber defined between the slanting weir wall and the opposite housing wall 3. Preferably, the overflow area 36, is located in this acute angled corner 42.

Figure 4:
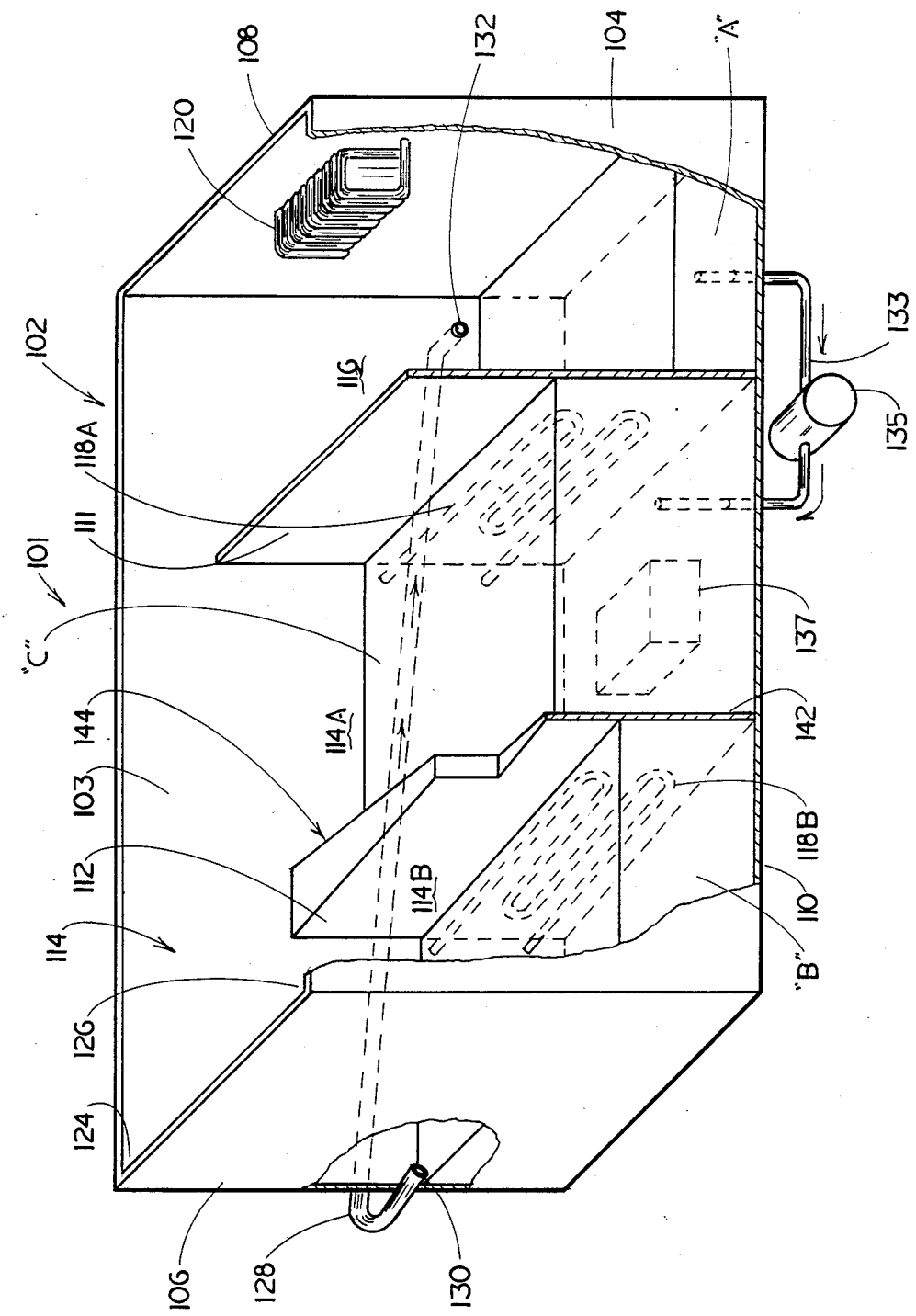
FIG. 4 is a perspective schematic representation, partially broken away, of another embodiment of a vapor generating and recovery apparatus embodying the present invention.

FIG. 4 shows another advantageous vapor generating and recovery apparatus 101 comprising a housing 102 having two side walls 103 and 104, two end walls 106 and 108, and a bottom wall 110. In the apparatus 101, a weir 111 divides the interior of the housing into a vaporizing chamber 114 and a condensing chamber 116. A first weir 112, essentially identical in construction to the weir 12 used in the apparatus of FIG. 1, is disposed across the housing 102 extending between the side walls 103 and 104 in a generally non-parallel relationship to the weir 111 sub-dividing the vaporizing chamber 114 into two vaporizing sub-chambers 114A and 114B. The first weir 112 is lower than the weir 111.

As shown, a heating coil 118A is disposed in a vertical plane along the wall surface of the weir 111 in the vaporizing sub-chamber 114A, and a similar heating coil 118B is disposed in a vertical plane along the wall surface of the first weir 112 in the vaporizing sub-chamber 114B. A condensing coil 120 is mounted adjacent the end wall 108 of the housing in the condensing chamber 116.

The heating coils 118A and 118B provide sufficient heat to cause the liquid cleaning solution in the vaporizing sub-chambers 114A and 114B, respectively, to boil and vaporize.

The condensing coil 120 maintains a preselected temperature in the condensing chamber 116 below the vaporizing temperature of the liquid cleaning solution thereby causing the vaporized solution to condense in the condensing chamber 116 and prevents the vapor from escaping from the housing.

The housing end wall 106 of the housing 101 is generally in non-parallel relationship with the wall surface of the first weir 112 in the vaporizing sub-chamber 114B. Thus, of the two corners 124 and 126 of the vaporizing sub-chamber 114B across from the first weir 112, one corner, for example corner 124, will be farther away from the second weir 112 than the other corner 126. Liquid return means are located in the corner 124 furthest from the first weir 112 for skimming the surface of the solution (denoted as the letter "B") in the sub-chamber 114B. The liquid return means is illustrated as comprising a conduit 128 having an open inlet end 130 located at the furthest corner 124 from the weir 112 in the sub-chamber 114B at the normal operating level of the solution "B", and an outlet end 132 open to the condensing chamber 118 above the normal operating level of the condensed solution (denoted as the letter "A") therein.

Condensed solution "A" is transferred from the condensing chamber 116 to the vaporizing sub-chamber 114A through a condensate conduit 133 which has its open inlet end in the bottom region of the condensing chamber 116 below the normal operating level of the solution "A", and its open outlet end in the bottom region of the vaporizing sub-chamber 114A below the normal operating level of the solution (denoted as the letter "C"). A condensate pump 135 is located in the condensate conduit 133 to pump the condensate solution from the condensate chamber 116 into the vaporizing sub-chamber 114A adjacent weir 111 as indicated by the flow arrows.

An ultrasonic transducer 137 is mounted on the bottom 110 of the housing 102 inside the vaporizing sub-chamber 114A to generate cavitation in the solution "C" in the vaporizing sub-chamber 114A so as to dislodge hard to remove soil, and the like, from objects which are immersed into the boiling solution "C".

As solution "A" is pumped from the condensing chamber 116 into the vaporizing sub-chamber 114A, the level of the solution "C" in the sub-chamber 114A will overflow the first weir 112 into the vaporizing sub-chamber 114B.

The weir 112 also has the overflow area 36, preferably located toward one end of the weir 112. The wall surface of the weir 112 in the vaporizing sub-chamber 114A is tapered such as to provide an acute angle between the weir 112 and the adjoining housing side 104 in the sub-chamber 114A. This is accomplished by slanting the wall surface of the weir 112 so that it is in non-parallel relationship to the wall surface of the weir 111 in the vaporizing sub-chamber 114A across the sub-chamber 114A from the first weir 112. Thus the acute angle defined between the first weir 112 and adjacent housing side wall 104 defines a corner 142 of the vaporizing sub-chamber 114A which is farther away from the weir 111 than is the other corner 144 of the sub-chamber 114A defined between the slanting wall surface of the first weir 112 and the other housing side wall 103. Preferably, the overflow area 36 is located in this acute angled corner 142.

Figure 5:
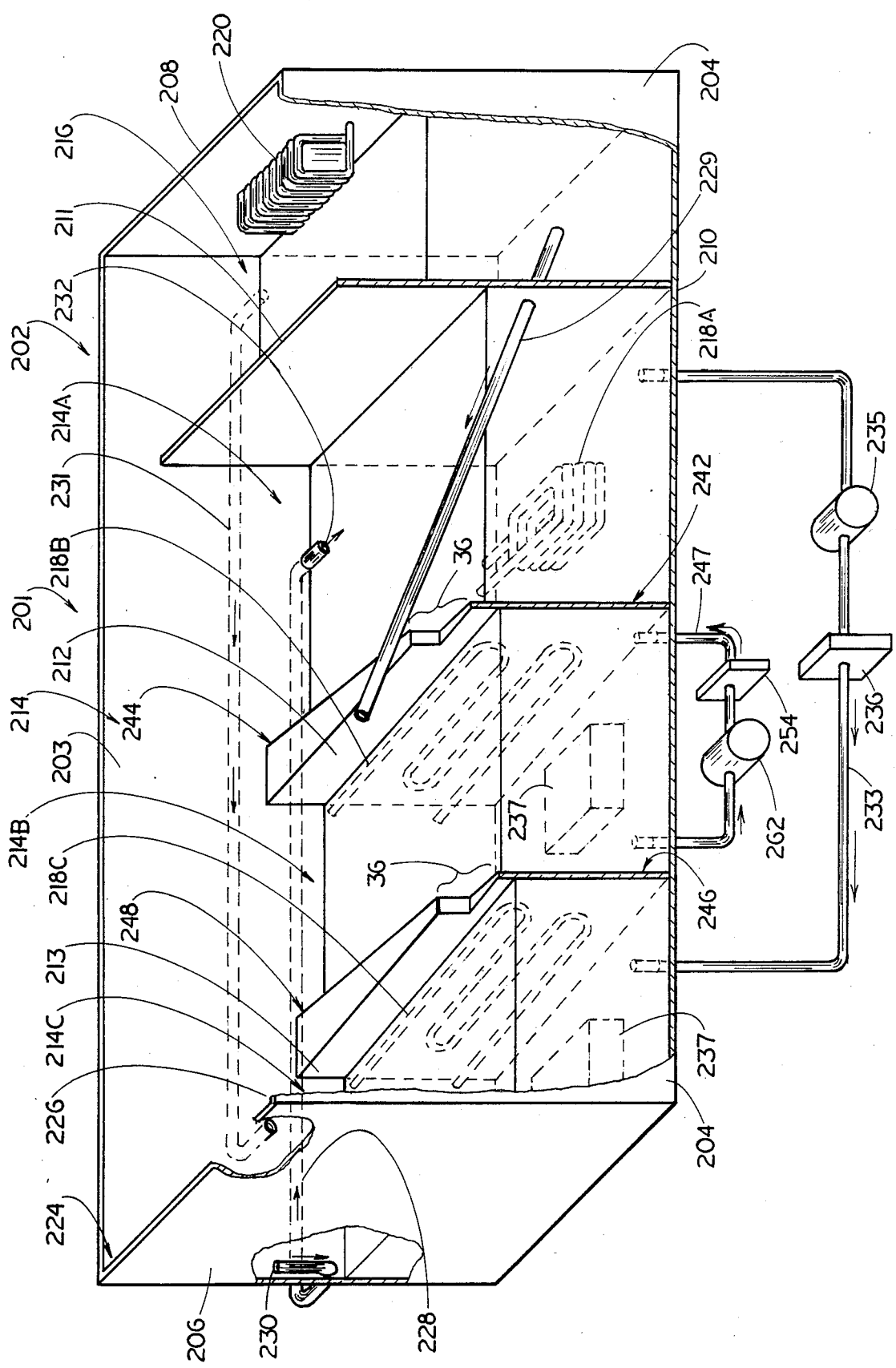
FIG. 5 is a perspective schematic representation, partially broken away, of a further embodiment of a vapor generating and recovery apparatus embodying the present invention.

FIG. 5 illustrates a further advantageous vapor generating and recovery apparatus 201 comprising a housing 202 having two side walls 203 and 204, two end walls 206 and 208, and a bottom wall 210. A weir 211 is located within the housing extending between the housing side walls 203 and 204 dividing the interior of the housing into two chambers, for example, a vaporizing chamber 214 and a condensing chamber 216. The vaporizing chamber 214 is sub-divided into three vaporizing sub-chambers 214A, 214B and 214C by means of a first weir 212 and a second weir 213. As shown, the first weir 212 is located with the vaporizing chamber 214 and extends between the housing side walls 203 and 204 in spaced apart, generally non-parallel relationship to the weir 211, thus, co-operating with the weir 211 and housing side walls to define the sub-chamber 214A. Similarly, the second weir 213 is located within the vaporizing chamber 214 between the first weir 212 and housing end wall 206 and extends between the housing side walls 203 and 204 in spaced apart, and either parallel or non-parallel to the first weir 212, thus, cooperating with the first weir 212 and housing side walls to define the sub-chamber 214B, and cooperating with the housing end wall 206 and housing side walls to define the sub-chamber 214C. It should be noted that both the first weir 212 and second weir 213 are essentially identical in configuration to the weir 12 used in the apparatus of FIG. 1 and to the weir 112 of the apparatus of FIG. 4. However, as discussed hereinafter, the weirs 212 and 213 may take other geometric configurations. All of the weirs: weir 211, first weir 212, and second weir 213 are each of a different selected height. The second weir 213 is an overflow weir for solution flowing from the sub-chamber 214B into the sub-chamber 214C, and the first weir 212, which terminates above the second weir 213, is an overflow weir for solution flowing from the sub-chamber 214A into the sub-chamber 214B. The weir 211 terminates above the first weir and is of such a height to preclude the overflow of solution from the condensing chamber 216 into the sub-chamber 214A, but allows vapors from the vaporizing sub-chambers 214A, 214B and 214C to move freely into the condensing chamber 216.

As shown, a heating coil 218A is disposed at the bottom region of the vaporizing sub-chamber 214A, a heating coil 218B is disposed in the vaporizing sub-chamber 214B at the wall surface of the first wall 212, and a heating coil 218C is disposed in the vaporizing sub-chamber 214C at the wall surface of the second weir 213. A condensing coil 220 is mounted adjacent the housing end wall 208 in the condensing chamber 216. Preferably, the condensing coil 220 is located below the upper extremity of the weir 211, but above the liquid condensate.

The heating coils 218A, 218B and 218C provide sufficient heat to cause a solution in the sub-chambers 214A, 214B and 214C, respectively, to boil and vaporize.

The condensing coil 220 maintains a preselected temperature in the condensing chamber 216 below the vaporizing temperature of the solution thereby causing the vaporized solution to condense in the condensing chamber 216 and preventing the vapor from escaping the housing.

The housing end wall 206 is in non-parallel relationship with the wall surface of the second weir 213 in the vaporizing sub-chamber 214C. Thus, of the two corners 224 and 226 of the vaporizing sub-chamber 214C across from the second weir 213, one corner, for example, corner 224 will be farther away from the second weir 213 than the other corner 226. Liquid return means are located in the further corner 224 from the second weir 213 for skimming the surface of the solution in the sub-chamber 214C. The liquid return means is illustrated as comprising a conduit 228 having an open end 230 located at the farther corner 224 from the second weir 213 in the sub-chamber 214C at the normal operating level of the solution therein, and an outlet end 232 open to the vaporizing sub-chamber 214A above the normal operating level of the solution therein.

The vapor generating and recovery apparatus 201 is particularly well suited for vaporizing and condensing a composite liquid solution of two or more immiscible components. Towards this end, two separate paths of liquid communication are established from the condensing chamber 216 to the vaporizing chamber 214 by means of conduits 229 and 231. Conduit 229 is shown as being angularly oriented to the horizontal with its lower inlet end near the bottom region of the condensing chamber 216, and its upper outlet end in the vaporizing sub-chamber 214B above the normal operating level of the liquid solution therein. As depicted, the conduit 229 extends through the weir 211, but it should be realized that the conduit 229 can extend around the outside of the housing 202 without departing from the scope of the invention. The conduit 231 is shown as being generally horizontally disposed with its inlet end at a preselected location below the upper extremity of the weir 211 in the condensing chamber 216, and its outlet end in the vaporizing sub-chamber 214C below the upper extremity of the second weir 213 and above the desired operating level of the solution therein.

In operation, when the level of the condensed solution in the condensing chamber 216 reaches a level equal to the outlet end of the conduit 229, the heavier immiscible component will flow through the conduit 229 from the condensing chamber 216 and discharge into the vaporizing sub-chamber 214B through the outlet end of the conduit 229.

Further, as the level of the condensed solution in the condensing chamber 216 reaches the inlet end of the conduit 231, the lighter immiscible component flows through the conduit 231 from the condensing chamber 216 and discharges into the vaporizing sub-chamber 214C through the open outlet end of the conduit 231.

Liquid is transferred from the vaporizing sub-chamber 214A to the vaporizing sub-chamber 214C through a conduit 233 which has its open inlet end in the bottom region of the vaporizing sub-chamber 214A below the normal operating level of the solution therein, and its open outlet end in the bottom region of the vaporizing sub-chamber 214C below the normal operating level of the solution therein. A pump 235 is located in the conduit 233 to pump solution from the vaporizing sub-chamber 214A into the vaporizing sub-chamber 214C as indicated by the arrows. A filter 236 is located in the conduit 233 to separate contaminates from the solution as it is pumped through the conduit 233.

The apparatus 201 also includes means for continuously removing solution from the vaporizing sub-chamber 214B, separating contaminants from the solution and returning the clean solution back to the vaporizing sub-chamber 214B. This means comprises a conduit 247 having its open inlet end open to the bottom region of the vaporizing sub-chamber 214B and its open outlet end also open to the bottom region of th vaporizing sub-chamber 214B a distance away from the open inlet end. A filter 254 is located in the conduit 247 to separate contaminates from the solution as it moves through the conduit 247, and a pump 262 is also located in the conduit 247 to pump solution from the vaporizing sub-chamber 214B, through the filter and back into the vaporizing sub-chamber 214B.

Ultrasonic transducers 237 are mounted on the bottom 210 of the housing 202 inside each of the vaporizing sub-chambers 214B and 214C to cavitate the solutions in sub-chambers 214B and 214C so as to dislodge hard to remove material from the objects which are immersed into the solution therein.

The first and second weirs 212 and 213 respectively, are each provided with the overflow area 36. The overflow area 36 of each of the first and second weirs is preferably located toward one end of its associated weir. Further, as illustrated, the overflow area 36 of the first weir 212 is located directly across the vaporizing sub-chamber 214B from the overflow area 36 of the second weir 123. The wall surface of the first weir 212 in the vaporizing sub-chamber 214A is tapered such as to provide an acute angle between the first weir 212 and the adjoining housing side wall 204 in the sub-chamber 214A. This is accomplished by slanting the wall surface of the first weir 212 so that it is in non-parallel relationship to the wall surface of the weir 211 in the vaporizing sub-chamber 214A across the sub-chamber 214A from the weir 211. Thus, the acute angle defined between the first weir 212 and adjoining housing side wall 204 defines a corner 242 of the vaporizing sub-chamber 214A which is farther away from the weir 211 than is the other corner 244 of the sub-chamber 214A defined between the slanting wall surface of the first weir 212 and the other housing side wall 203. Preferably, the overflow area 36 of the first weir 212 is located in this acute angled corner 242. Similarly, the wall surface of the second weir 213 in the vaporizing sub-chamber 214B is tapered such as to provide an acute angle between the second weir 213 and the adjoining housing side wall 204 in the sub-chamber 214B. This is accomplished by slanting the wall surface of the second weir 213 so that it is in non-parallel relationship to the wall surface of the first weir 212 in the vaporizing sub-chamber 214B across the sub-chamber 214B from the first weir 212. Thus, the acute angle defined between the second weir 213 and adjacent housing side wall 204 defines a corner 246 of the vaporizing sub-chamber 214B which is farther away from the first weir 212 than is the other corner 248 of the sub-chamber 214B defined between the slanting wall surface of the second weir 213 and the other housing side wall 203. Preferably, the overflow area 36 of the second weir 213 is located in this acute angled corner 246. The corner 224 of the vaporizing sub-chamber 214C having the open inlet 230 of the conduit 228 is illustrated as being catercorner from the overflow area 36 of the second weir 213 across the vaporizing sub-chamber 214C.

The weir 22 of FIGS. 1 through 3, the weir 112 of FIG. 4 and weirs 212 and 213 of FIG. 5 can have various configurations in plane view. By way of example, four different plane view configurations are shown in FIGS. 6 through 9.

Figure 6:
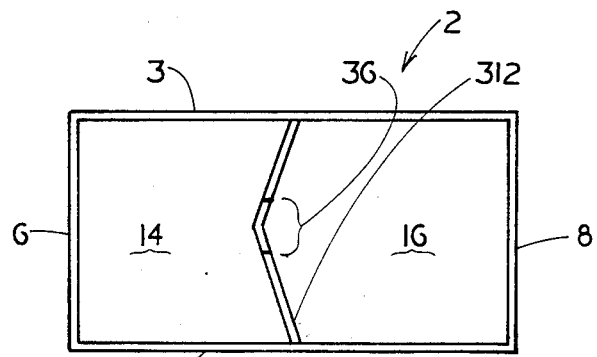
FIG. 6 is a plan view of the vapor generating and recovery apparatus of FIG. 1 with a further embodiment of the weir.

FIG. 6 illustrates a weir 312 disposed across the housing 2 extending between the side walls 3 and 4 dividing the interior of the housing into two chambers 14 and 16. Weir 312, in plane view, is chevron shaped with the apex of the chevron located approximately half way between the housing side walls 3 and 4. In this embodiment, the overflow area 36 is located at the apex of the chevron shaped weir.

Figure 7:
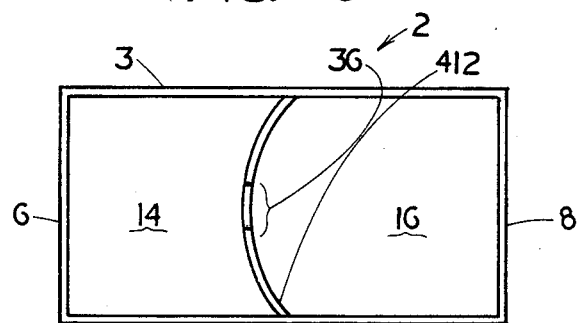
FIG. 7 is a plan view of the vapor generating and recovery apparatus of FIG. 1 with a further embodiment of the weir.

With reference to FIG. 7, there is shown a weir 412 disposed across the housing 2 extending between the side walls 3 and 4 dividing the housing into two chambers 14 and 16 which is arcuate in plane view and oriented to present its concave wall surface to the condensing chamber 16. The weir 412 also includes an overflow area 36 approximately mid-way between the housing side walls 3 and 4.

Figure 8:
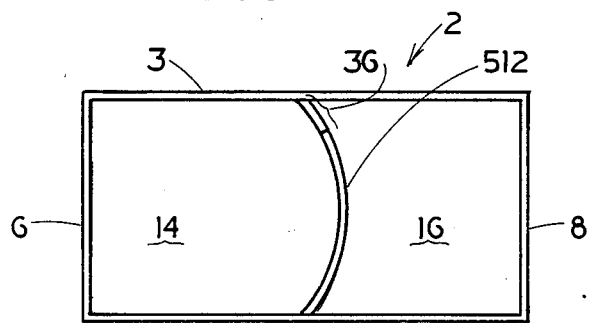
FIG. 8 is a plan view of the vapor generating and recovery apparatus of FIG. 1 with a further embodiment of the weir.

FIG. 8 illustrates an arcuate weir 512 disposed in the housing 2 extending between the housing side walls 3 and 4 and oriented to present its concave wall surface to the condensing chamber 16. The weir 512 is provided with an overflow area 36 at its juncture with one of the side walls, for example side wall 3.

Figure 9:
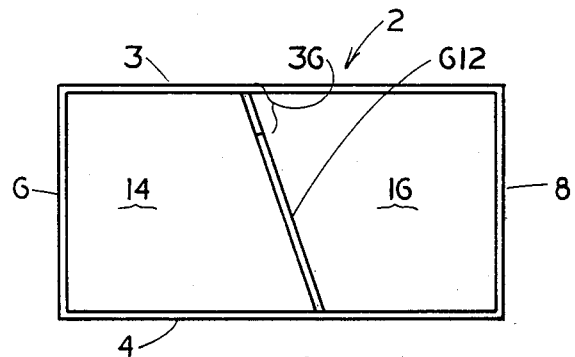
FIG. 9 is a plan view of the vapor generating and recovery apparatus of FIG. 1 with a further embodiment of the weir.

In FIG. 9, the housing 2 is divided into two chambers 14 and 16 by a weir 612 which extends between the housing side walls 3 and 4. As shown, the weir 612 is planar so that the wall surface it presents to the chamber 14 is parallel to the wall surface it presents to the chamber 16. Further, the planar weir 612 is disposed within the housing 2 in non-parallel relationship to the housing end walls 6 and 8 and cooperates with one of the housing side walls, for example, side wall 3 to define an acute angle corner 42 in the chamber 16. The weir 612 is provided with an overflow area 36 in the acute angle corner 42.

It will be realized that various changes may be made to the specific embodiments shown and described without departing from the principals and spirit of the present invention.

What is claimed is:

1. A vapor generating and recovery apparatus comprising:
   a housing having two end walls and two side walls;
   a first weir disposed within the housing extending from one side wall to the other side wall dividing the interior of said housing into two chambers, said weir having at least one side configured in non-parallel relationship to both of the housing end walls, said first weir having means defining a liquid overflow area at a preselected location along the top of said weir for promoting the flow of liquid from one of the chambers to the other of the chambers, the preselected location of the overflow area being at a location of the first weir furthest from the housing end wall across the chamber from which the liquid flows;
   means for condensing vapor in said housing; and
   means for vaporizing liquid condensate in said housing.

2. The vapor generating and recovery apparatus of claim 1 wherein said weir is tapered along its length from one housing side wall to the other housing side wall defining an acute angle corner between the weir and one housing side wall in said chamber from which the liquid flows, said preselected location of the overflow area being adjacent the acute angle corner.

3. The vapor generating and recovery apparatus of claim 1 wherein the overflow area is defined by the top edge of said first weir being lower at the preselected location than other locations along the length of said first weir.

4. The vapor generating and recovery apparatus of claim 3 wherein the liquid overflow area of said first weir comprises means defining a notch formed in the top edge of said first weir.

5. The vapor generating and recovery apparatus of claim 3 wherein the top edge of said first weir is inclined along at least a portion of the length of said first weir to define the liquid overflow area at the lower region of said inclined top edge.

6. The vapor generating and recovery apparatus of claim 1 wherein the liquid overflow area of said first weir comprises means defining an aperture formed through said first weir below the top edge thereof.

7. The vapor generating and recovery apparatus of claim 1 further comprising at least one second weir disposed within said housing in spaced apart relationship to said first weir and cooperating with said first weir to divide said housing into at least three chambers, said at least one second weir having means defining a liquid overflow area at a preselected location along the top of said second weir for promoting the flow of liquid from one of said chambers to the other of said chambers only at the preselected location.

8. The vapor generating and recovery apparatus of claim 7 wherein the overflow area of said first weir is directly across the chamber defined between said first and second weirs from the overflow area of said second weir.

9. The vapor generating and recovery apparatus of claim 8, wherein:
the overflow area of said first weir is located proximate a corner of a chamber defined thereby; and
the overflow area of said at least one second weir is located proximate a corner of chamber defined thereby.

10. The vapor generating and recovery apparatus of claim 9, wherein;
said corner of said chamber defined by said first weir is an acute angle corner; and,
said corner of said chamber defined by said second weir is an acute angle corner.

11. The vapor generating and recovery apparatus of claim 7, wherein:
said overflow area of said first weir is defined by the top edge of said first weir being lower at the preselected location than the other locations along the length of said first weir; and,
said overflow area of said at least one second weir is defined by the top edge of said second weir being lower at the preselected location than the other locations along the length of said second weir.

12. The vapor generating and recovery apparatus of claim 11, wherein:
the overflow area of said first weir comprises means defining a notch formed in the top edge of said first weir; and,
the overflow area of at least one second weir comprises means defining a notch formed in the top edge of said at least one second weir.

13. The vapor generating and recovery apparatus of claim 11, wherein:
the top edge of said first weir is inclined along at least a portion of the length of said first weir to define the overflow area at the lower region of said inclined top edge; and,
the top edge of said at least one second weir is inclined along at least a portion of the length of said at least one second weir to define the overflow area at the lower region of said inclined top edge.

14. The vapor generating and recovery apparatus of claim 7, wherein:
the overflow area of said first weir comprises means defining an aperture formed through said first weir below the top edge of said first weir; and,
the overflow area of said at least one second weir comprises means defining an aperture formed through said at least one second weir below the top edge of said at least one second weir.

* * * * *